Figure 1:
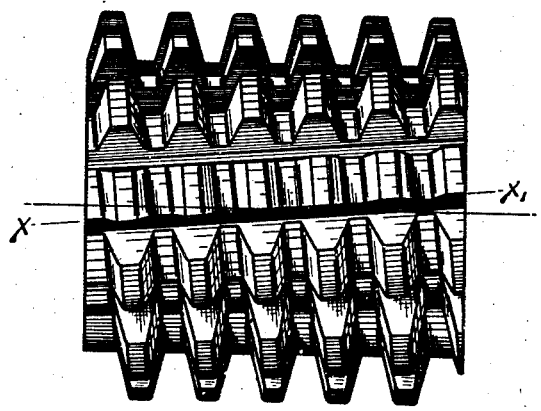

W. F. ZIMMERMANN.
HELICAL CUTTER.
APPLICATION FILED APR. 21, 1910.

1,003,130.  Patented Sept. 12, 1911.

WITNESSES.
B. E. Barnes.
W. L. Hoagland.

INVENTOR.
William F. Zimmermann.

UNITED STATES PATENT OFFICE.

WILLIAM F. ZIMMERMANN, OF NEWARK, NEW JERSEY.

HELICAL CUTTER.

1,003,130. Specification of Letters Patent. Patented Sept. 12, 1911.

Original application filed February 18, 1907, Serial No. 357,844. Divided and this application filed April 21, 1910. Serial No. 556,668.

*To all whom it may concern:*

Be it known that I, WILLIAM F. ZIMMERMANN, a citizen of the United States, and a resident of the city of Newark, in the county of Essex and State of New Jersey, have invented certain new and useful Improvements in Helical Cutters; and I do hereby declare the following specification, taken in connection with the drawings forming part of the same, to be a full, clear, and exact description of the principle of said invention and the best mode in which I have contemplated applying that principle, so as to distinguish it from other inventions.

The invention relates primarily to helical or hob cutters for producing the teeth of spur and helical or spiral gears as shown in the application filed Feb. 18th, 1907, Serial Number 357,844 of which the present application is a division.

The primary object of the present invention is to provide a cutter, having teeth of a truncated wedge shape, modified to differ from a theoretically correct cutter, so as to produce gear wheels with teeth of such form, as will run practically silent at comparatively fast pitch line velocities.

It is an established and well-known fact that gear-wheels, with teeth whose form was generated conjugate to a straight sided rack-tool, produce an objectionable humming noise when running in mesh at, what now-a-days may only be termed, an average peripheral speed. This objection to the theoretically correct form of gear tooth may be explained in the following manner: When the teeth of gear wheels are produced in accordance with theory, to have a correct involute form, it may be readily shown that, when the point of contact between two intermeshing teeth is substantially in the line of centers, the adjacent teeth are out of contact and as the two contacting teeth advance, there is a sensible space of time when there is only a single pair of teeth in contact and another sensible space of time when two pairs of teeth are in contact. Now, when the first pair of teeth recedes and the second pair approaches, it leaves only the second pair in contact, thus throwing the entire load upon that pair, until the next pair approaches in contact, when the strains are again divided between the two pairs. These sudden changes of strains from full load to half load and vice versa cause a series of shocks which at a fast speed produce the humming noise heretofore referred to. By deviating slightly from the theoretically correct involute form of gear tooth this humming noise may be completely overcome and practically silent running gear wheels produced. In order to do this the theoretical involute form of the teeth must be so altered that the load on the receding pair of teeth is gradually diminished and simultaneously, the load on the approaching pair is gradually increased so that there is no sudden transition from full load to half load and from half load to full load, between any successive pairs of teeth, thereby eliminating the series of shocks which, as stated, are entirely due to the sudden changes of pressure.

To enable a better understanding of this invention, the meaning of the terms "theoretical rack tooth" and "the theoretical pitch of a rack tooth" as used in the claims, will be explained. A theoretical rack tooth is a tooth formed similar to a truncated wedge with straight sides, and is the base of the involute system of gear tooth curves. The theoretical pitch of a rack tooth is the distance between the center of two consecutive teeth measured on the pitch line. In measuring the pitch of a rack tooth, the same is always measured on a straight line, whereas the pitch of a gear is measured on a curved line. A rack, however, is merely a gear with an infinite radius.

The pitch of a gear is determined and fixed by the number of teeth in the pitch circle of the gear. To find the pitch of a gear, the product of the diameter of the pitch circle by the factor 3.14159 is divided by the number of teeth in the gear. The pitch thus found would be known as the circular pitch of the gear and is equal to the arc subtended at the pitch line by the angle formed at the center in bisecting two adjacent teeth. This circular pitch when rectified, would be the pitch of the rack teeth and would then be known as the linear pitch of the rack.

The present invention comprises a helical cutter, having cutting teeth of a truncated wedge shape symmetrical with respect to their axes, and a pitch or a distance between the axes of two adjacent teeth, of less length than the true pitch of the gear to be produced therewith, whereby the points of the teeth are slightly relieved from the theoretical involute to insure the gradual diminishing of the load on the receding pair of intermeshing teeth and the gradual increasing of the load on the approaching pair.

The annexed drawings and the following description set forth in detail, certain mechanism embodying means constituting however, but one of the various mechanical forms in which the principle of the invention may be used, as for example, the adaptation thereof to the planing method.

The novelty of the invention will be readily understood from the drawings and the following description thereof and is more particularly pointed out in the claims.

Figure 3:
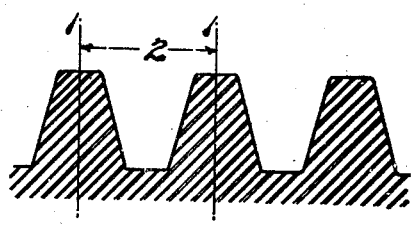
Figure 2:
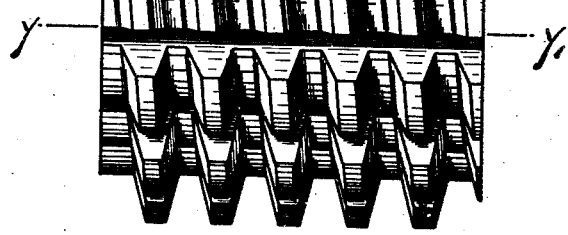

Now, referring to the drawings: Figure 1 is a side elevation of a helical cutter having teeth of truncated wedges and the slots forming the cutting faces normal to the helices of the cutter. Fig. 2, is also a side elevation of a helical cutter, having teeth of truncated wedges but with the slots forming the cutting faces in a diametral plane of the cutter. Fig. 3 is a section of Fig. 1 at X X, and of Fig. 2 at Y Y, illustrating a cross section of the cutting teeth.

In Fig. 1, the cutter as shown, is provided with the cutting faces of the teeth normal to the helices and the contour of said teeth is symmetrical with respect to their axes 1 (see Fig. 3). This style of cutter may be formed either with a lathe or a milling machine. The usual and ordinary method of forming a helical cutter with a lathe, results in a tooth upon the cutter which is not symmetrical in a plane normal to the helix, and this for the reason that the edges of the tool, used in cutting the helical cutter, are made symmetrical with respect to the axes of such tool. This results in producing a cutter with teeth which are not symmetrical in the plane normal to the helix, so that when in use with this normal plane, parallel to the face of the gear to be cut, the sides of the teeth presented to the face of the gear are not symmetrical with respect to their axes, resulting in producing unsymmetrical sides in the teeth of the finished gear. This difficulty is, however, overcome by placing the tool, with which the helical cutter is formed, with the plane of its cutting edge at an angle with the axis of the cutter, equal to the angle of the helix, or in other words, the plane of the cutting edge of the tool lies either in the plane normal to the helix or in a plane parallel to this normal. Now, in the ordinary helical cutter, the lathe is usually geared up for the linear pitch, that is, for the pitch of the helices, parallel with the axis, resulting in an improper pitch normal to the helices, or, in other words, in a plane in which the cutter is to be used. Therefore it becomes necessary, to obtain the correct pitch of the gear to be cut, to provide the cutter with the actual pitch of the gear in a plane normal to the helices. In this invention, however, to obtain quiet running gears, as hereinbefore explained, this normal pitch 2 (see Fig. 3) is of slightly less length than the true pitch of the gear to be cut therewith, to slightly relieve the points of the gear teeth from the theoretical involute form and thereby eliminate the series of intermittent shocks caused by the theoretically correct involute teeth. To obtain the shortened normal pitch, the linear pitch must be calculated therefrom and the lathe geared accordingly.

If the helical cutter is formed with a milling machine, the shortened normal pitch is obtained by merely shortening the lead. The objection to forming a helical cutter in a milling machine is that the sides of the cutting teeth thereof, will not be straight nor symmetrical, the amount of variance depending upon the number of teeth of the milling cutter in action during any one instant of the forming operation.

In Fig. 2 a helical cutter is shown which is substantially the same as that shown in Fig. 1, but with this difference, that the shortened pitch is in a diametral plane and the cutting teeth are symmetrical in said plane. The advantage of this cutter is that it need not be set at an angle when used for cutting spur gears as would be the case if a cutter such as shown in Fig. 1 is used.

If a helical cutter is shortened in the normal pitch, as stated above, and the height of cutting teeth remains the standard length the resulting tooth of the gear will be somewhat shallow for the proper thickness at the pitch line. This difference is, however, immaterial, and if necessary, may be overcome by merely lengthening the cutting teeth slightly beyond the standard.

It should be noted as before stated, that this invention is not confined to a helical cutter but may be used with equally advantageous results in a planing tool, as for example, Fig. 3 would be a fair representation of the profile of such a planing tool.

Having described my invention, I claim as new and desire to secure by Letters Patent:

1. A helical or hob cutter with cutting faces of truncated wedge shape and the pitch of the helices of said cutter of slightly less length than the pitch of a theoretical rack tooth.

2. A helical or hob cutter with a normal pitch of slightly less length than the pitch of a theoretical rack tooth.

3. A cutter having cutting faces of truncated wedge shape and a pitch of slightly less length than the pitch of a theoretical rack tooth.

WM. F. ZIMMERMANN.

Witnesses:
H. W. JACOBSON,
B. E. BARNES.